(12) United States Patent
Brück et al.

(10) Patent No.: US 9,752,484 B2
(45) Date of Patent: Sep. 5, 2017

(54) METHOD FOR OPERATING A DEVICE FOR THE DOSED SUPPLY OF A LIQUID

(71) Applicant: CONTINENTAL AUTOMOTIVE GMBH, Hannover (DE)

(72) Inventors: Rolf Brück, Bergisch Gladbach (DE); Jan Hodgson, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/786,320

(22) PCT Filed: Apr. 16, 2014

(86) PCT No.: PCT/EP2014/057840
§ 371 (c)(1),
(2) Date: Oct. 22, 2015

(87) PCT Pub. No.: WO2014/173789
PCT Pub. Date: Oct. 30, 2014

(65) Prior Publication Data
US 2016/0069238 A1     Mar. 10, 2016

(30) Foreign Application Priority Data

Apr. 26, 2013   (DE) .................. 10 2013 104 245

(51) Int. Cl.
*F04B 49/06*     (2006.01)
*F01N 3/28*      (2006.01)
(Continued)

(52) U.S. Cl.
CPC ............. *F01N 3/28* (2013.01); *F01N 3/2066* (2013.01); *F01N 9/00* (2013.01); *F04C 5/00* (2013.01);
(Continued)

(58) Field of Classification Search
CPC ........ F04B 9/045; F04B 43/123; F04B 45/08; F01N 2610/1433; F01N 2610/144
See application file for complete search history.

(56) References Cited

U.S. PATENT DOCUMENTS 5,006,049 A     4/1991   Von der Heyde et al.
5,012,562 A     5/1991   Catallo
(Continued)

FOREIGN PATENT DOCUMENTS

DE          2 49 307 A     9/1987
DE          92 11 095 U1   12/1993
(Continued)

*Primary Examiner* — Jonathan Matthias
(74) *Attorney, Agent, or Firm* — Cozen O'Connor

(57) ABSTRACT

A method for operating a device for the dosed supply of a liquid includes: detecting a demanded dose amount of the liquid; activating an electric drive of a pump to move a seal in a delivery direction from an inlet to an outlet to deliver the liquid by application of an operating voltage to the electric drive; stopping operation of the pump when the delivered amount of the liquid corresponds to the demanded dose amount; stopping movement of an eccentric; and maintaining a holding voltage at the electric drive. In response to the holding voltage, a holding torque is exerted on the eccentric and a movement of the eccentric counter to the delivery direction is prevented.

6 Claims, 4 Drawing Sheets

(51) Int. Cl.
*F01N 3/20* (2006.01)
*F01N 9/00* (2006.01)
*F04C 5/00* (2006.01)
*F04C 2/22* (2006.01)

(52) U.S. Cl.
CPC .... *F01N 2610/02* (2013.01); *F01N 2610/144* (2013.01); *F01N 2610/1433* (2013.01); *F04C 2/22* (2013.01); *Y02T 10/24* (2013.01); *Y02T 10/47* (2013.01)

(56) References Cited

U.S. PATENT DOCUMENTS

| | | | |
|---|---|---|---|
| 5,988,998 | A | 11/1999 | Glover |
| 7,267,531 | B2 | 9/2007 | Anderson et al. |
| 8,568,115 | B2 | 10/2013 | Lauer |
| 8,773,061 | B2 | 7/2014 | Taka |
| 2009/0301064 | A1* | 12/2009 | Maier ................... F01N 3/2066 60/286 |
| 2012/0176075 | A1* | 7/2012 | Taka ........................ H02P 8/30 318/685 |
| 2013/0323083 | A1 | 12/2013 | Maguin et al. |
| 2014/0033684 | A1 | 2/2014 | Hodgson et al. |
| 2015/0013825 | A1* | 1/2015 | Trebbi ................ F04B 43/1261 141/1 |

FOREIGN PATENT DOCUMENTS

| | | |
|---|---|---|
| DE | 102 10 213 A1 | 9/2003 |
| DE | 10 2007 020 573 A1 | 11/2008 |
| DE | 60 2004 010 185 T2 | 11/2008 |
| DE | 10 2010 053 903 A1 | 6/2012 |
| DE | 102011010644 | 8/2012 |
| DE | 10 2011 016967 A1 | 10/2012 |
| FR | 2 966 872 A1 | 5/2012 |
| GB | 768253 | 2/1957 |
| GB | 2 031 520 A | 4/1980 |
| JP | S 5584891 A | 6/1980 |
| JP | H 01315687 A | 12/1989 |
| JP | H 0538377 U | 5/1993 |
| JP | H0177969 U | 3/1998 |
| JP | 2012147558 A | 8/2012 |
| WO | WO 2011/162696 A1 | 12/2011 |

\* cited by examiner

METHOD FOR OPERATING A DEVICE FOR THE DOSED SUPPLY OF A LIQUID

CROSS-REFERENCE TO RELATED APPLICATIONS

This is a U.S. national stage of application No. PCT/EP2014/057840, filed on 16 Apr. 2014, which claims priority to the German Application No. DE 10 2013 104 245.7 filed 26 Apr. 2013, the content of both incorporated herein by reference.

BACKGROUND OF THE INVENTION

1. Field of the Invention

The invention relates to a method for operating a device for the dosed supply of a liquid.

2. Related Art

A device of this type may also be referred to as delivery device and/or as dosing device. A device of this type may be used, for example, in a motor vehicle in order to feed a liquid additive for exhaust-gas purification to an exhaust-gas treatment device of the motor vehicle. In exhaust-gas treatment devices requiring a liquid additive for operation, the method of selective catalytic reduction (SCR), for example, is implemented. In this method, nitrogen oxide compounds in the exhaust gas of an internal combustion engine are reduced with the aid of a reducing agent. Ammonia is commonly used as reducing agent. Ammonia is normally stored in motor vehicles not directly but in the form of a reducing agent precursor solution, which is stored as a liquid in a tank and which is supplied by way of a corresponding device, which may be operated in accordance with the method described here. A liquid that is particularly commonly used in this context is urea-water solution which, for the purposes of exhaust-gas purification, is available under the trade name AdBlue® with a urea content of 32.5%.

For successful exhaust-gas purification, highly accurately dosed metering of the liquid into an exhaust-gas treatment device is desired, that is to say the amount of liquid metered corresponds as accurately as possible to a requirement in the exhaust-gas treatment device. Furthermore, a device for the dosed supply of a liquid should be producible and operable as inexpensively as possible, and should as far as possible not be able to be damaged by liquid freezing within the device, because the described (aqueous) liquids can freeze at low temperatures. In motor vehicles, low temperatures arise for example during relatively long standstill phases.

For the delivery of such liquids, devices which have a non-branched delivery line from a tank to an injector at an exhaust-gas treatment device have proven to be particularly advantageous. Such devices for providing a supply typically do not have a return line which permits circulation of liquid through the device and back into the tank. A return line of this type was provided because it was possible for air bubbles in the device to be easily and reliably removed via the return line. However, a return line of this type entails increased cost expenditure, and is no longer required for the removal of air bubbles.

The dosing (i.e., metering) of the liquid by way of the device is preferably performed with the aid of an injector (dosing valve), which can be opened and closed in electronically actuated fashion. The amount of liquid dispensed by the device is in this case typically proportional to the opening time of the injector. For this purpose, the pressure of the liquid prevailing at the injector must correspond as accurately as possible to a target pressure, because the amount of liquid dosed by an injector during a predefined opening time exhibits a high dependency on the pressure of the liquid at the injector.

Between multiple individual dosing processes of the injector, it is desirable for the pressure of the liquid in a pressure line section between a pump and the injector to be kept substantially constant in order that the injector can dose liquid in the desired manner immediately when a dosing demand is placed on the injector.

Devices for the supply of a liquid typically have at least one pump for the delivery of the liquid and for maintaining the pressure at the injector. However, the pumps used for such devices typically have the disadvantage that a backflow of liquid can occur through the pump. As a result of this backflow, the pressure at the injector is falsified, and thus the dosing accuracy is reduced.

Taking this as a starting point, it is an object of the present invention to solve or at least alleviate the technical problems highlighted in connection with the prior art. It is sought in particular to disclose a particularly advantageous method for operating a device for the dosed supply of a liquid, with which method particularly high dosing accuracy of the supply of the liquid can be achieved.

SUMMARY OF THE INVENTION

In accordance with one aspect of the invention, there is proposed a method for operating a device for the dosed supply of a liquid, at least having at least one pump for delivering the liquid, wherein the at least one pump has a pump housing with at least one inlet and at least one outlet, wherein an eccentric is arranged on the pump housing so as to be rotatable relative to the pump housing, wherein a deformable diaphragm is situated between the eccentric and the pump housing, which diaphragm, together with the pump housing, delimits a delivery path from the at least one inlet to the at least one outlet and forms at least one seal of the delivery path, wherein the at least one seal is displaceable along the delivery path by a movement of the eccentric for delivery purposes, and the pump has an electric drive for moving the eccentric. The method includes:

a) detecting a demanded dose amount of liquid;
b) activating the electric drive of the at least one pump, in order to move the at least one seal in a delivery direction from the inlet to the outlet for the purposes of delivering the liquid, through the application of an operating voltage to the electric drive;
c) scheduling a stoppage of operation of the at least one pump when the delivered amount of liquid corresponds to the demanded dose amount;
d) stopping the movement of the eccentric;
e) maintaining a holding voltage at the electric drive, wherein, by means of the holding voltage, a holding torque is exerted on the eccentric and a movement of the eccentric counter to the delivery direction is prevented.

The device preferably has a suction line extending from the at least one pump to a tank in which the liquid is stored. The suction line is preferably connected to the inlet of the pump. The device preferably furthermore has a pressure line which extends from the pump to a metering point for the metering of the liquid into an exhaust-gas treatment device. The pressure line is connected to the outlet of the pump. It is also possible for multiple (parallel) suction lines to lead to multiple pumps (for example of different delivery power), which pumps are in each case connected (in particular in non-branched fashion) via pressure lines to an individual injector or to multiple injectors. Further branchings of the line system of the device are preferably not provided. In particular, there is preferably no return line that produces a connection of the outlet of the pump back to the tank.

A pump with the described construction can be referred to as an orbital pump. The delivery path is formed by a gap between the deformable diaphragm and the pump housing. The deformable diaphragm is preferably arranged between the eccentric and the pump housing such that the deformable diaphragm is pinched between the housing and the eccentric in the region of the at least one seal. The gap between the deformable diaphragm and the pump housing is thereby closed in fluid-tight fashion in the region of the at least one seal. The gap or the delivery path is filled with the liquid during the operation of the device. Along the delivery path, the at least one seal divides the delivery path, such that at least one (closed) delivery volume is formed. As a result of the displacement of the seal by way of a movement of the eccentric, the delivery volume is displaced in a delivery direction proceeding from the inlet of the pump toward the outlet of the pump. In this way, delivery of the liquid is performed.

The pump housing of the pump is preferably a ring or a cylindrical chamber in which the eccentric is arranged (centrally) at the inside. The pump housing may then be regarded as an (external) stator of the pump, whereas the eccentric can be referred to as an (internal) rotor. In a further embodiment of the described pump, it is however also possible for the pump housing to form an internal stator of the pump, which is surrounded by the eccentric. The eccentric then forms an external rotor. The inlet and the outlet are arranged on the pump housing and permit the inflow of the liquid into, and the outflow of the liquid out of, the pump housing or the delivery path between the deformable diaphragm and the pump housing.

On the pump, there is preferably also provided a partition, which prevents an undesired backflow of the liquid from the outlet to the inlet. The partition may, for example, be in the form of a depression in the pump housing or of a thickened portion of the deformable diaphragm. The partition is arranged (in positionally fixed fashion or permanently) between the outlet and the inlet of the pump. The partition prevents a direct connection for the liquid from the outlet to the inlet from being formed at any time as a result of the movement of the eccentric relative to the pump housing. The partition can also be ensured by virtue of the deformable diaphragm being braced, screwed or adhesively bonded to the housing between the outlet and the inlet.

The eccentric is preferably of multi-part form. The eccentric preferably has an (inner) eccentric region, which performs an eccentric rotational movement, and an (outer) bearing ring, which surrounds the eccentric region. It is preferable for at least one bearing to be situated between the eccentric region and the bearing ring. The bearing may be a ball bearing or a roller bearing. The eccentric region of the eccentric performs a rotational movement about an axis of rotation during operation. An external shape of the eccentric yields an eccentric movement of a surface of the eccentric region. The eccentric movement is transmitted to the bearing ring. The bearing between eccentric region and bearing ring prevents the rotational movement of the eccentric region from being transmitted, together with the eccentric movement, to the bearing ring. Through the combination of the eccentric region and of a bearing ring with bearing arranged in between, an eccentric rotational movement of the eccentric region can be converted into an eccentric wobbling movement of the bearing ring without a rotational movement component. The fact that the movement of the bearing ring does not have a rotational movement component makes it possible for shear stresses in the deformable diaphragm to be reduced. It is preferably the case that the deformable diaphragm is merely flexed by the eccentric. It is preferably the case that only pressure forces, and substantially no friction forces, act at a contact surface of the eccentric with the deformable diaphragm, which friction forces would arise as a result of friction of the eccentric against the diaphragm if the contact surface with the deformable diaphragm were to also exhibit a rotational movement component. A corresponding division of the eccentric into an eccentric region and a bearing ring is also possible if the eccentric is an external rotor arranged around a housing which forms an internal stator.

The electric drive is connected by way of a shaft (axle) to the eccentric of the pump in order that the electric drive can drive the eccentric of the pump. The electric drive typically comprises an electric motor with at least one drive coil which generates a magnetic field when an electrical current flows through it. The electric field then causes a rotor of the electric drive to move.

The method is accordingly in particular configured for the orbital pumps discussed here, or suitable for the operation thereof. This will now be discussed in detail below.

The detection of a demanded dose amount in step a) may, for example, be performed by a control unit that monitors the operation of the device and/or of the exhaust-gas treatment device. A demanded dose amount of liquid can be detected if, in an exhaust-gas treatment device of a motor vehicle, a suitable amount of liquid is required for exhaust-gas purification, wherein the device for the metering of liquid (for example the injector) is connected to the exhaust-gas treatment device. The detection may, for example, be performed on the basis of present measurement values of the internal combustion engine and/or of the exhaust-gas treatment device and/or on the basis of characteristic values/characteristic curves determined in advance (and stored and/or adapted in the control unit). Here, the dose amount may be predefined/set directly or else as a regulation parameter which is unique thereto or characteristic thereof (for example opening time of the injector).

Through the activation of the electric drive of the pump in step b), the electric drive of the pump is set in motion in order to move the eccentric and the at least one seal for the purposes of delivering the liquid. If an operating voltage is applied to the electric drive, it is normally also the case that an electrical current flows, which generates a magnetic field in a drive coil of the drive, wherein the magnetic field sets the rotor of the electric drive in motion. When the electric drive has been activated, the delivered amount of liquid is preferably monitored. This may be performed, for example, by monitoring the movement of the eccentric and/or the movement of the electric drive connected to the eccentric. The delivered amount of liquid is normally proportional to the movement of the eccentric or to the movement of the electric drive. It is also possible for the supplied amount of liquid to be determined by way of a throughflow measurement. A throughflow measurement may, for example, be performed at an injector for the metering of the liquid into an exhaust-gas treatment device. A throughflow measurement may be performed, for example, by detecting the opening time of the injector and of the pressure of the liquid prevailing at the injector, and by calculating the throughflow rate from this information.

When the delivered amount of liquid corresponds to the dose amount demanded as per step a), a stoppage of operation of the pump is scheduled (step c)). This may also be performed in a control unit. The movement of the eccentric is then (directly or immediately) stopped in step d) by virtue of the electric drive of the pump being stopped. It is thus achieved, in any case, that the eccentric comes to rest, or moves no further in the delivery direction.

In step e), a holding voltage applied to the electric drive is maintained. It is also possible for the drive voltage of the drive to initially be fully deactivated and then for a (reduced) holding voltage to be supplied in step e). The holding voltage is so low that the eccentric no longer moves but remains in its present position, and in particular does not move backward counter to the delivery direction. Here, it is provided that the holding voltage assumes a value which is greater than zero ("0") and lower than the operating voltage. In particular, the holding voltage is configured such that it holds the eccentric stationary or blocks the eccentric, specifically even counter to a prevailing pressure of the liquid.

The liquid in the delivery path, owing to its pressure, exerts forces on the eccentric and on the deformable diaphragm.

Depending on the orientation of the eccentric, the forces may act with a radial direction and/or with a tangential direction. Here, radial forces are directed toward the axis of rotation of the eccentric, whereas tangential forces run tangentially with respect to the axis of rotation of the eccentric. Tangential forces exert a pressure torque on the eccentric. By means of the (reduced) holding voltage, a holding torque can be exerted on the eccentric, which holding torque counteracts the pressure torque and thus prevents a movement of the eccentric. In this way, the pressure within the pressure line from the outlet of the pump to the injector can be maintained.

The capability to fix the position of the eccentric by virtue of a holding voltage being applied to the electric drive has the advantage that no mechanical measures are required for holding the eccentric in a desired position. The holding of the eccentric in a desired position may be realized by electronic measures alone.

The method is particularly advantageous if, during step e), it is at least the case that a friction torque acts that assists the holding torque.

The friction torque particularly preferably acts on at least one of the following locations:
  between the deformable diaphragm and the pump housing;
  between the deformable diaphragm and the eccentric;
  within a bearing of the eccentric; and
  within the electric drive.

The pump may, for example, be configured such that, during operation, frictional contact exists between the deformable diaphragm and the pump housing and/or between the deformable diaphragm and the eccentric, which frictional contact imparts a defined friction torque during step e). The friction torque may also be generated within a bearing of the eccentric and/or within an electric drive. The friction torque is preferably predefined by the construction of the pump and easily determinable by a person skilled in the art.

The additional friction torque of the holding torque gives rise to a certain inaccuracy in the required magnitude of the holding torque. The holding torque need not correspond exactly to the pressure torque in order for a movement of the eccentric to be prevented during step e). Certain inaccuracies in the holding torque can be compensated for by the friction torque. This makes it possible for the electronics that generate the holding torque to be of simpler design. At the same time, the combination of a friction torque and of an electric holding torque for fixing the position of the eccentric is advantageous because the friction torque can be relatively low. The force required for holding the eccentric in position is imparted by the electric holding torque, whereas the friction torque serves merely for the compensation of inaccuracies and tolerances in the force in relation to the acting pressure force.

The method is furthermore advantageous if the holding voltage is selected such that the holding torque lies between a maximum torque and a minimum torque that can be exerted on the eccentric by the liquid owing to a pressure difference between the at least one outlet and the at least one inlet.

It is preferable for the holding torque to correspond exactly to the mean torque of maximum torque and minimum torque. It is preferably the case that, in addition to the electric holding torque, friction torques act, which can each compensate for the differences in relation to the maximum torque and the minimum torque. It is accordingly possible to achieve a particularly advantageous ratio of friction torques acting within the pump and the required accuracy or tolerance of the holding torque.

The device is furthermore advantageous if the electric drive of the pump has a power consumption of less than 15 W [watts] when the holding voltage is applied to the electric drive. The power consumption is preferably even less than 10 W or even less than 5 W. The power consumption during step e) is a power loss, which is converted entirely into heat. A power loss of less than 15 W is, however, acceptable in the case of a device for supplying a liquid for exhaust-gas purification.

It is furthermore advantageous if the holding voltage is generated by pulse width modulation.

Pulse width modulation is a particularly efficient manner of reducing the voltage for an electric drive of a pump. In particular, pulse width modulation also permits individual adaptation of the holding voltage, such that the holding voltage, for example for particular individual pumps, in order to realize compensation of manufacturing tolerances. For this purpose, it is necessary for corresponding parameters in a control unit, which control the generation of the holding voltage by pulse width modulation, to be correspondingly adapted.

The method is furthermore advantageous if the position of the eccentric relative to the pump housing is detected before step e), and a maximum possible torque that can be exerted on the eccentric by the liquid is determined on the basis of the position, and the holding voltage is set in a manner dependent on the maximum possible torque.

The torque exerted by the liquid on the eccentric may vary in a manner dependent on the position in which the eccentric is arranged relative to the pump housing. This is, for example, linked to the fact that the cross-sectional areas of the eccentric and of the delivery duct between the deformable diaphragm and the pump housing vary in a manner dependent on the position in which the eccentric is situated. In particular, those regions of the eccentric or of the deformable diaphragm which are fluidically connected to the outlet of the pump and to the inlet of the pump, respectively, may be of different sizes. The pressure acting in the delivery path at the inlet of the pump is generally lower than the pressure acting in the delivery path at the outlet of the pump. Accordingly, different positions of the eccentric relative to the housing can give rise to different resultant pressure torques. Here, it is now proposed that the holding voltage (and thus the holding torque) be individually adapted to the actually or presently acting pressure torques. A particularly low holding voltage is made possible in this way. In particular, positions of the eccentric may also be encountered in which no holding voltage is necessary, because the torques exerted on the eccentric by the liquid are in equilibrium. The adaptation of the electric holding voltage to the acting pressure torques may likewise be achieved in an effective manner by pulse width modulation. In other words, it is proposed that, in the case of repeated execution of the method, the holding voltage in step e) be varied, in particular in a manner dependent on the pressure forces acting on the eccentric in and/or counter to the delivery direction.

Also proposed is a motor vehicle, at least having an internal combustion engine, an exhaust-gas treatment device for the purification of the exhaust gases of the internal combustion engine, and a device for delivering a liquid to the exhaust-gas treatment device, wherein the device is designed to be operated in accordance with the described method, and wherein the liquid is urea-water solution.

In the exhaust-gas treatment device there is preferably arranged an SCR catalytic converter by which the method of selective catalytic reduction can be carried out in order to reduce nitrogen oxide compounds in the exhaust gas of the internal combustion engine. The liquid supplied by the device is used for this purpose. The device may have all of the device features described here in conjunction with the method. The motor vehicle preferably also has a control unit (which is possibly separate—that is to say separate from the engine controller) connected to the device, or at least to the at least one pump and to the at least one injector of the device, and in which the routines, characteristic values etc. for carrying out the described method may be stored.

BRIEF DESCRIPTION OF THE DRAWINGS

The invention and the technical field will be explained in more detail below on the basis of the figures. The figures show particular exemplary embodiments, to which the invention is however not restricted. It is pointed out in particular that the figures, and in particular the dimensional relationships illustrated in the figures, are merely schematic. In the figures.

DETAILED DESCRIPTION OF THE PRESENTLY PREFERRED EMBODIMENTS

Figure 1:
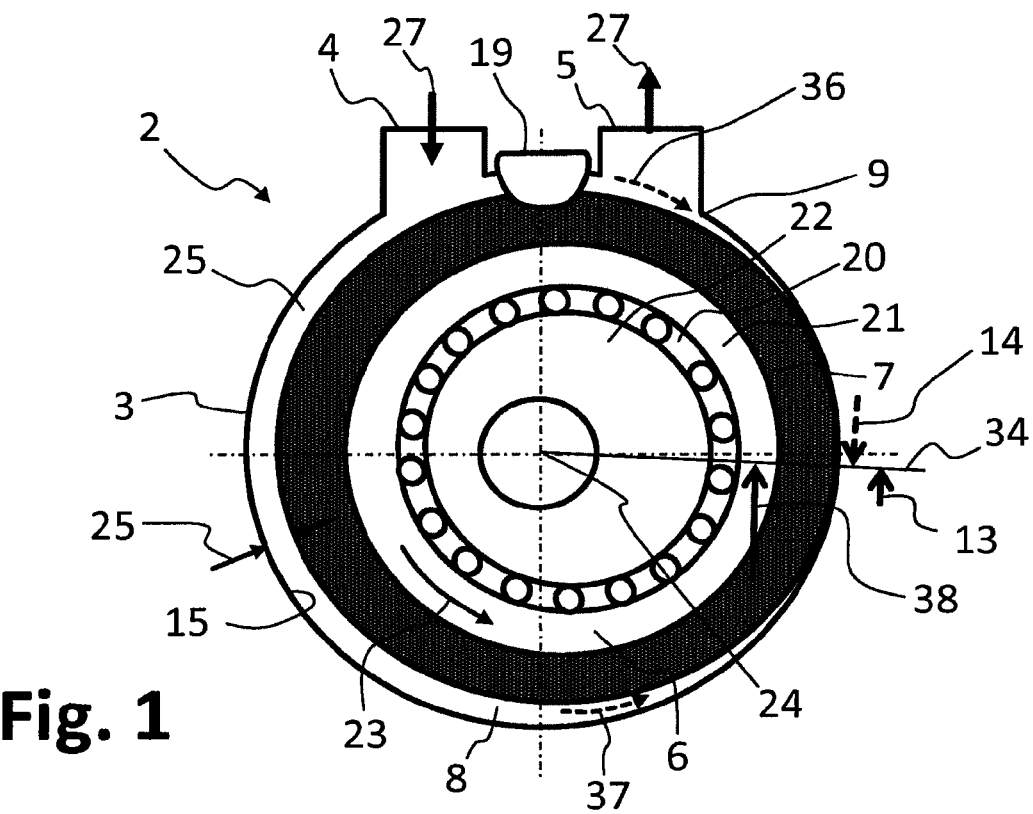
FIG. 1: shows a first design variant of a pump for a device.

FIG. 1 illustrates a pump 2 having a pump housing 3 with an inlet 4 and an outlet 5. An eccentric 6 is arranged within the pump housing 3. The deformable diaphragm 7 is situated between the eccentric 6 and the pump housing 3. Between the deformable diaphragm 7 and the pump housing 3 there is a delivery path 8 which runs from the inlet 4 to the outlet 5. The delivery path 8 is sealed off (closed off) at one point by a seal 9. At the seal 9, the deformable diaphragm 7 bears directly against the housing 3. The seal 9 can be displaced by way of an eccentric movement of the eccentric 6. This gives rise to a delivery of the liquid in a delivery direction 27 from the inlet 4 to the outlet 5. The eccentric 6 is divided into an inner eccentric region 22 and an outer bearing ring 21. The inner eccentric region 22 is separated from the outer bearing ring 21 by a bearing 20. When the eccentric region 22 is rotated about the shaft 24 in a direction of rotation 23 corresponding to the delivery direction 27, the bearing ring 21 performs the described eccentric movement. Between the inlet 4 and the outlet 5 there is provided a (positionally fixed, permanent) partition 19, which in this case is in the form of a cam which locally compresses the deformable diaphragm 7. The partition 19 prevents a backflow of the liquid from the outlet 5 back to the inlet 4.

FIG. 1 also shows a cross section 25 of the delivery path 8 between the deformable diaphragm 7 and the pump housing 3. Depending on the size of this cross section 25 in the respective region of the delivery path 8, different outlet pressure forces 36 and inlet pressure forces 37 are exerted on the eccentric 6. The inlet pressure force 37 and the outlet pressure force 36 result in the pressure torque 14 which is (at least) compensated by the holding torque 38.

Furthermore, a friction torque 13 may also act within the pump 2, which friction torque compensates for inaccuracies in the holding torque 38. The friction torque 13 may act in different directions depending on whether the holding torque 38 or the pressure torque 14 is greater.

Figure 2:
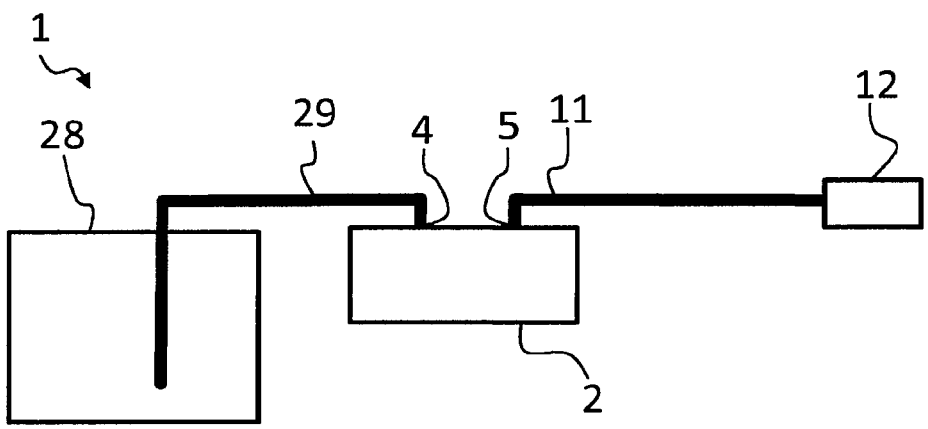
FIG. 2: shows a device for the described method.

FIG. 2 shows a device 1 having a pump 2 which draws in liquid from a tank 28 via a (single) suction line 29. The suction line 29 is connected to a (single) inlet 4 of the (single) pump 2. A (single, non-branched) pressure line 11 is connected to a (single) outlet 5 of the pump 2, which pressure line leads to a (single) injector 12 for the metering of the liquid into an exhaust-gas treatment device.

Figure 3:
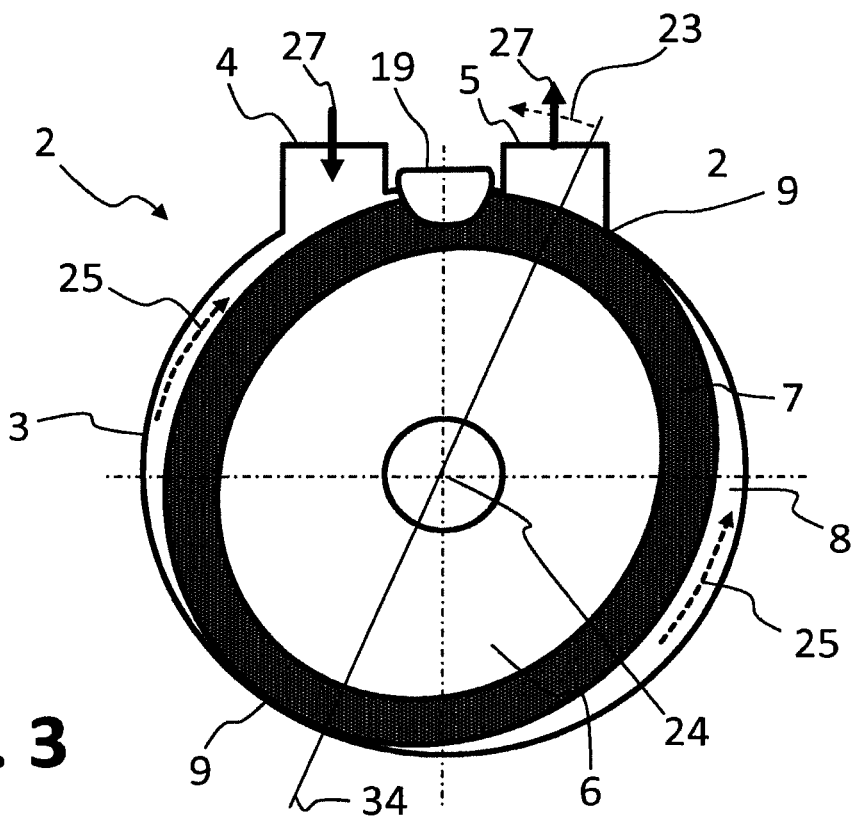
FIG. 3: shows a second design variant of a pump for a device.

FIG. 3 shows a second design variant of a pump 2 for a described device, which differs from the pump illustrated in FIG. 1 in that the eccentric 6 and the deformable diaphragm 7 form two seals 9 which are moved along the delivery path 8 as a result of a rotational movement of the eccentric 6 relative to the pump housing 3. In the case of this pump 2, however, there is no division of the eccentric 6 into a bearing ring and an eccentric region.

Figure 4:
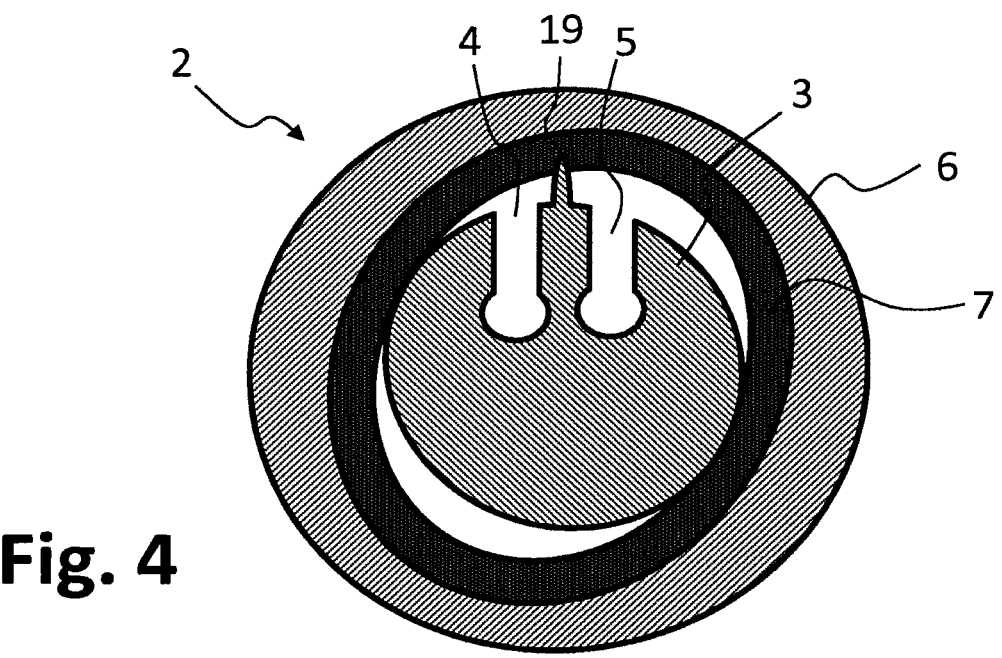
FIG. 4: shows a third design variant of a pump for a device.

FIG. 4 shows, in highly schematic form, a further design variant of a pump 2, in which the pump housing 3 is arranged at the inside and the eccentric 6 is arranged around the pump housing 3 at the outside. Here, too, the deformable diaphragm 7 is situated between the pump housing 3 and the eccentric 6. The inlet 4 and the outlet 5 are arranged on the pump housing 3, and a partition 19 is provided for preventing a backflow of the liquid from the outlet 5 to the inlet 4.

Figure 5:
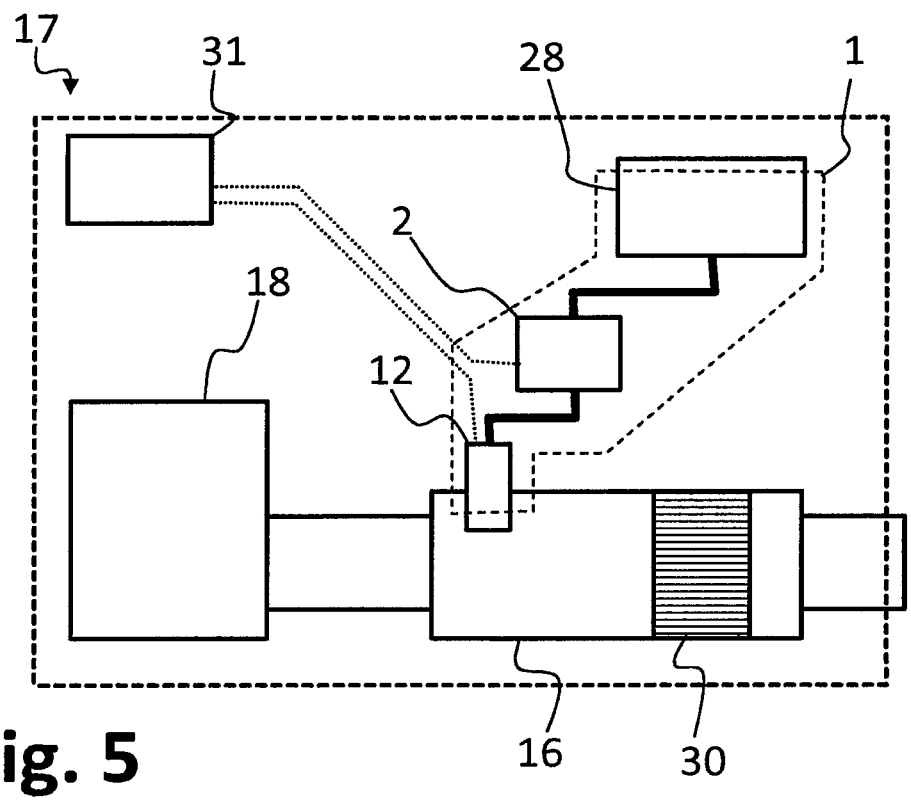
FIG. 5: shows a motor vehicle having a device which can be operated in accordance with the described method.

FIG. 5 shows a motor vehicle 17, having an internal combustion engine 18 and an exhaust-gas treatment device 16 for the purification of the exhaust gases of the internal combustion engine 18, in which exhaust-gas treatment device there is arranged an SCR catalytic converter 30. The exhaust-gas treatment device 16 can be supplied with liquid by an injector 12. The injector 12 is a constituent part of a device 1 which extracts the liquid from a tank 28 and delivers the liquid to the injector 12 by way of a pump 2. At least the pump 2 and the injector 12 are connected to a control unit 31 by which the execution of the described method can be performed. The method may be implemented as a routine in the control unit 31.

Figure 6:
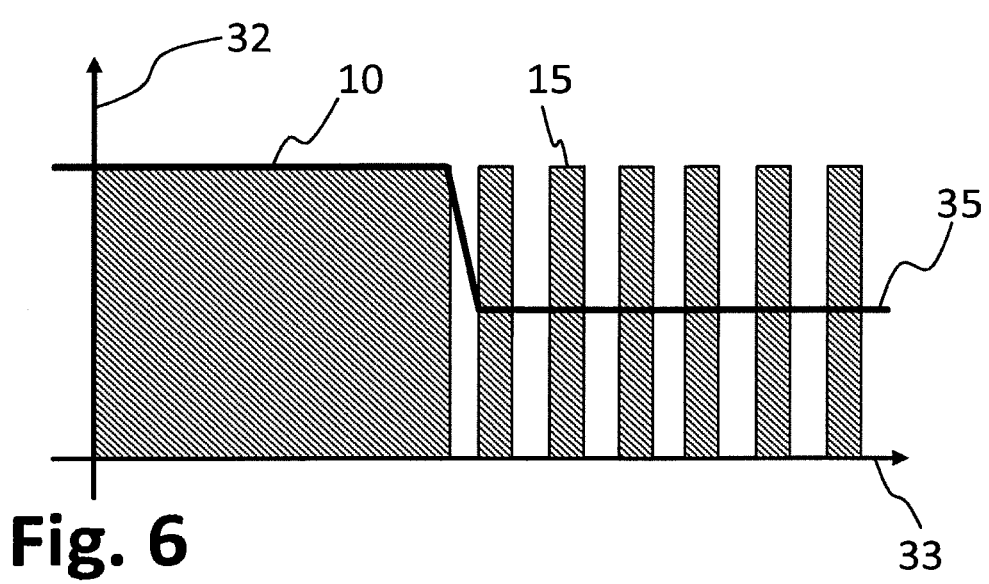
FIG. 6: is a schematic illustration of a pulse width modulation.

FIG. 6 schematically illustrates the functioning of a pulse width modulation 15 for the supply of a holding voltage 35. In the diagram, the operating voltage 10 of the pump is plotted on the voltage axis 32 versus the time axis 33. In the front region, an operating voltage 10 is applied which is required for, moving the electric drive and the eccentric. In the rear region of the diagram, pulse width modulation 15 is performed, by which the operating voltage 10 is reduced to the holding voltage 35. The magnitude of the holding voltage 35 can be adjusted through suitable selection of the pulse lengths of the pulse width modulation 15.

Figure 7:
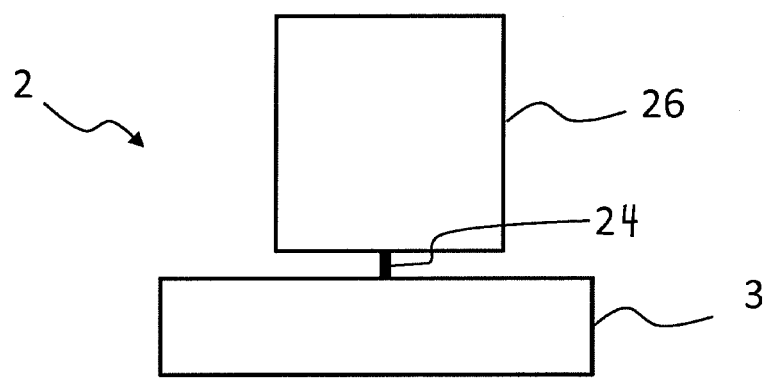
FIG. 7: is a schematic illustration of a pump in a cross-sectional direction.

FIG. 7 illustrates a pump 2 in highly simplified form. It can be seen here that the pump has the pump housing 3 in which the eccentric (not illustrated here) is arranged. The eccentric is connected to the drive 26 of the pump 2 via the shaft 24 (axle).

By way of precaution, it should also be noted that the combinations of technical features shown in the figures are not generally binding. For example, technical features from one figure may be combined with other technical features from a further figure and/or from the general description. The only exception to this is if the combination of features has been explicitly referred to here and/or a person skilled in the art identifies that the basic functions of the device can no longer be realized otherwise.

By the described method, it is made possible for a particularly inexpensive pump to be used for the dosed supply of a liquid, without special structural measures having to be implemented on the pump, and at the same time, very high dosing accuracy is possible by the pump, even for very small amounts of liquid.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a device (1) having: at least one pump (2) configured to deliver a liquid, the at least one pump (2) having a pump housing (3) having at least one inlet (4) and at least one outlet (5); an eccentric (6) arranged on the pump housing (3) so as to be rotatable relative to the pump housing (3); and a deformable diaphragm (7) arranged between the eccentric (6) and the pump housing (3), the deformable diaphragm (7) and the pump housing (3) delimiting a delivery path (8) from the at least one inlet (4) to the at least one outlet (5) and forming at least one seal (9) of the delivery path (8), the at least one seal (9) being displaceable along the delivery path (8) by a movement of the eccentric (6) to deliver the liquid, the at least one pump (2) having an electric drive (26) configured to move the eccentric (6), the method comprising:

detecting a demanded dose amount of the liquid;

activating the electric drive (26) of the at least one pump (2) to move the at least one seal (9) in a delivery direction (27) from the inlet (4) to the outlet (5) to deliver the liquid by application of an operating voltage (10) to the electric drive (26);

stopping operation of the at least one pump (2) when the delivered amount of the liquid corresponds to the demanded dose amount;

stopping movement of the eccentric (6); and maintaining a holding voltage (35) at the electric drive (26), wherein, in response to the holding voltage (25), a holding torque (38) is exerted on the eccentric (6) and a movement of the eccentric (6) counter to the delivery direction (27) is prevented.

2. The method as claimed in claim 1, wherein a friction torque (13) assists the exerted holding torque (38).

3. The method as claimed in claim 1, wherein the holding voltage (35) is selected such that the holding torque (38) lies between a maximum torque and a minimum torque that can be exerted on the eccentric (6) by the liquid due to a pressure difference between the at least one outlet (5) and the at least one inlet (4).

4. The method as claimed in claim 1, wherein the electric drive (26) of the pump (2) has a power consumption of less than 15 watts when the holding voltage (35) is applied to the electric drive (26).

5. The method as claimed in claim 1, wherein the holding voltage (35) is generated by pulse width modulation (15).

6. The method as claimed in claim 1, wherein a position (34) of the eccentric (6) relative to the pump housing (3) is detected before the maintaining, and a maximum possible torque that can be exerted on the eccentric (6) by the liquid is determined based on the position (34), and the holding voltage (35) is set based on the maximum possible torque.

\* \* \* \* \*